US007066568B2

(12) United States Patent
Komatsu et al.

(10) Patent No.: US 7,066,568 B2
(45) Date of Patent: Jun. 27, 2006

(54) DETERMINING METHOD FOR DETERMINING WHETHER INK WAS EJECTED OR NOT, COMPUTER-READABLE MEDIUM, AND PRINTING APPARATUS

(75) Inventors: Shinya Komatsu, Nagano-ken (JP); Hironori Endo, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 240 days.

(21) Appl. No.: 10/833,331

(22) Filed: Apr. 28, 2004

(65) Prior Publication Data

US 2005/0030331 A1 Feb. 10, 2005

(30) Foreign Application Priority Data

May 1, 2003 (JP) ............................ 2003-126797

(51) Int. Cl.
*B41J 29/393* (2006.01)
*B41J 3/42* (2006.01)
*H04N 1/46* (2006.01)

(52) U.S. Cl. .......................... 347/18; 358/504; 400/74

(58) Field of Classification Search .................. 347/19
See application file for complete search history.

(56) References Cited

U.S. PATENT DOCUMENTS 6,478,401 B1 * 11/2002 King et al. .................. 347/19
6,832,825 B1 * 12/2004 Nishikori et al. ............ 347/19

FOREIGN PATENT DOCUMENTS

JP 10-337937 A 12/1998

* cited by examiner

*Primary Examiner*—Lamson Nguyen
*Assistant Examiner*—Jannelle M. Lebron
(74) *Attorney, Agent, or Firm*—Sughrue Mion, PLLC

(57) ABSTRACT

A determining method and the like is achieved for determining more accurately whether or not ink has been ejected. A determining method for determining whether or not ink was ejected from a plurality of nozzles includes a step of printing a non-ejection print pattern, a step of obtaining an output value upon non-ejection that is output based on the light that has been emitted toward the non-ejection print pattern, a step of printing an all-ejection print pattern, a step of obtaining an output value upon ejection that is output based on the light emitted toward the all-ejection print pattern, a step of setting a threshold value between the output value upon non-ejection and the output value upon ejection, and a step of comparing the threshold value with an output value that is output from a light-receiving section based on the light that has been emitted toward the print patterns.

8 Claims, 15 Drawing Sheets

DETERMINING METHOD FOR DETERMINING WHETHER INK WAS EJECTED OR NOT, COMPUTER-READABLE MEDIUM, AND PRINTING APPARATUS

CROSS-REFERENCE TO RELATED APPLICATIONS

The present application claims priority upon Japanese Patent Application No. 2003-126797 filed on May 1, 2003, which is herein incorporated by reference.

BACKGROUND OF THE INVENTION

1. Field of the Invention

The present invention relates to determining methods for determining whether ink was ejected or not, computer-readable media, and printing apparatuses.

2. Description of the Related Art

Inkjet printers that emit light onto a print pattern formed by ejecting ink from each of a plurality of nozzles and that determine whether or not ink has been ejected based on the reflected light are known as printing apparatuses that use the reflected light, among the light emitted toward a print medium, to determine whether or not ink has been ejected from ink ejecting sections. Such inkjet printers are provided with an optical sensor having a light-emitting section and a light-receiving section, and emit light from the light-emitting section toward print blocks, each of which having been formed corresponding to a nozzle, and based on the output of the light-receiving section that receives the light that is reflected, determines whether or not ink was ejected.

The threshold value that serves as the criterion for determination is, for example, set to a value between an output value of the light-receiving section when light is irradiated onto a print medium on which nothing has been printed and an output value of the light-receiving section when light is not emitted.

However, the output of the light-receiving section is affected, for example, by the color of the ink that is used to print on the print medium, and the material and the coloring of the print medium. That is, for example, the light reflected by a print block that has been formed by black ink and the light reflected by a print block that has been formed by yellow ink result in different output values from the light-receiving section, and likewise, the output values of the light-receiving section with respect to light that has been reflected by print media having different coloring are different. Thus, with conventional threshold values, which are set to a value between the output value of the light-reviving section when light is irradiated on a print medium on which nothing has been printed and the output value of the light-receiving section when light is not irradiated, there is the problem that an error in detection may occur.

SUMMARY OF THE INVENTION

The present invention was arrived at in light of the foregoing issues, and it is an object thereof to provide a determining method for determining more accurately whether or not ink has been ejected, a computer-readable medium, and a printing apparatus.

A main aspect of the present invention is a determining method such as the following.

A determining method for determining whether or not ink was ejected from nozzles in a printing apparatus including a plurality of nozzles for ejecting ink and a sensor for emitting light toward a print medium on which a print pattern has been printed by ejecting ink from the plurality of nozzles and receiving the light that is reflected, comprises:

a step of printing a non-ejection print pattern that is made of print blocks that can be formed for each nozzle and in which only a print block to be determined, which is an object of determination, included within a region of the print medium that is irradiated by the light is not printed;

a step of emitting light from the sensor toward the print medium on which the non-ejection print pattern has been printed and obtaining an output value upon non-ejection that is output from the sensor;

a step of printing an all-ejection print pattern in which the print blocks have been printed in the entire area within the region of the print medium that is irradiated by the light;

a step of emitting light from the sensor toward the print medium on which the all-ejection print pattern has been printed and obtaining an output value upon ejection that is output from the sensor;

a step of setting a threshold value between the output value upon non-ejection and the output value upon ejection; and a step of comparing the threshold value with an output value that is output from the sensor based on light that is emitted toward a print medium on which the print pattern has been printed by ejecting ink from the plurality of nozzles.

Another main aspect of the present invention is a computer-readable medium such as the following.

A computer-readable medium for causing a printing apparatus, which includes a plurality of nozzles for ejecting ink and a sensor for emitting light toward a print medium on which a print pattern has been printed by ejecting ink from the plurality of nozzles and receiving the light that is reflected, to operate comprises the following codes for determining whether or not ink has been ejected from the nozzles:

a code for printing a non-ejection print pattern that is made of print blocks that can be formed for each nozzle and in which only a print block to be determined, which is an object of determination, included within a region of the print medium that is irradiated by the light is not printed;

a code for emitting light from the sensor toward the print medium on which the non-ejection print pattern has been printed and obtaining an output value upon non-ejection that is output from the sensor;

a code for printing an all-ejection print pattern in which the print blocks have been printed in the entire area within the region of the print medium that is irradiated by the light;

a code for emitting light from the sensor toward the print medium on which the all-ejection print pattern has been printed and obtaining an output value upon ejection that is output from the sensor;

a code for setting a threshold value between the output value upon non-ejection and the output value upon ejection; and a code for comparing the threshold value with an output value that is output from the sensor based on light that is emitted toward a print medium on which the print pattern has been printed by ejecting ink from the plurality of nozzles.

A further main aspect of the present invention is a printing apparatus such as the following.

A printing apparatus comprises:

a plurality of nozzles for ejecting ink;

a sensor for emitting light toward a print medium on which a print pattern made of print blocks that can be formed for each of the nozzles has been printed by ejecting ink from the plurality of nozzles and receiving the light that is reflected; and a determination section for determining whether or not ink has been ejected from the nozzles by comparing a predetermined threshold value with an output value that is output from the sensor based on light that is received by the sensor;

wherein the threshold value is set between an output value upon non-ejection and an output value upon ejection, the output value upon non-ejection being output from the sensor when only a print block to be determined, which is an object of the determination, included within a region of the print medium that is irradiated by the light is not printed, and the output value upon ejection being output from the sensor when the print blocks have been printed in the entire area of the region.

Other features of the present invention will become clear through the accompanying drawings and the following description.

BRIEF DESCRIPTION OF THE DRAWINGS

In order to facilitate a more complete understanding of the present invention and the advantages thereof, reference is now made to the following description taken in conjunction with the accompanying drawings.

DETAILED DESCRIPTION OF PREFERRED EMBODIMENTS

Figure 1:
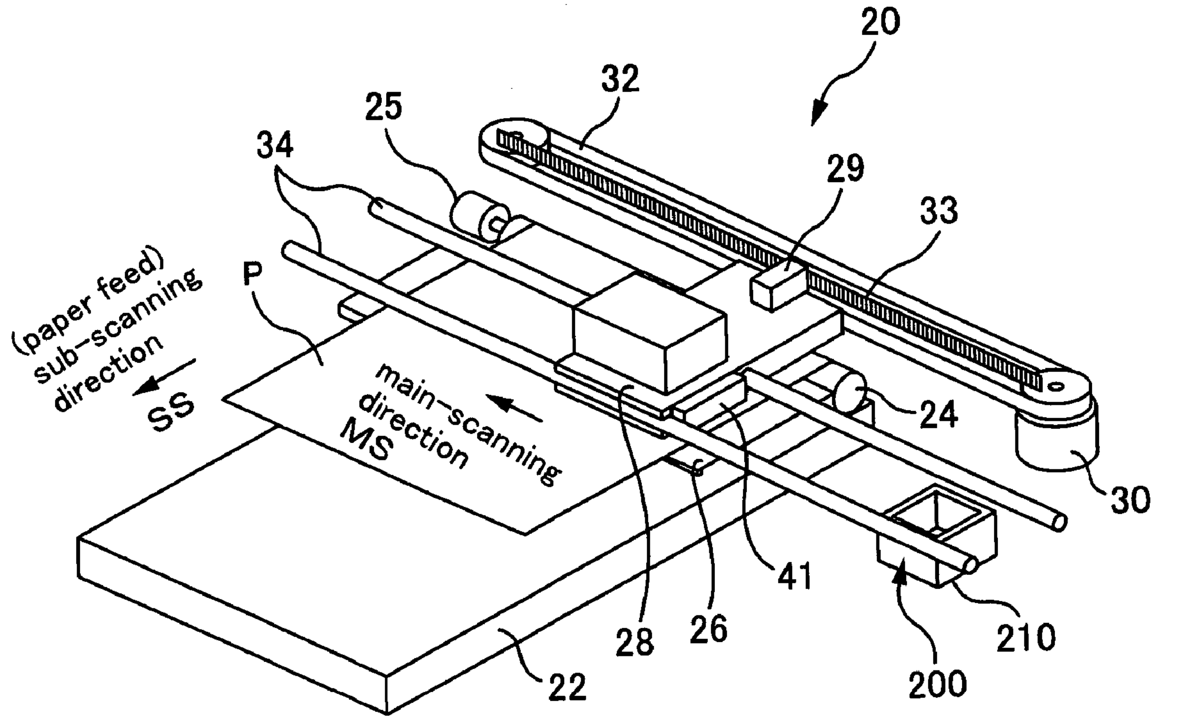
FIG. 1 is a perspective view schematically showing the primary structure of a color inkjet printer 20 according to an embodiment of the present invention.

At least the following matters will be made clear by the present specification and the accompanying drawings.

A determining method for determining whether or not ink was ejected from nozzles in a printing apparatus including a plurality of nozzles for ejecting ink and a sensor for emitting light toward a print medium on which a print pattern has been printed by ejecting ink from the plurality of nozzles and receiving the light that is reflected, comprises:

a step of printing a non-ejection print pattern that is made of print blocks that can be formed for each nozzle and in which only a print block to be determined, which is an object of determination, included within a region of the print medium that is irradiated by the light is not printed;

a step of emitting light from the sensor toward the print medium on which the non-ejection print pattern has been printed and obtaining an output value upon non-ejection that is output from the sensor;

a step of printing an all-ejection print pattern in which the print blocks have been printed in the entire area within the region of the print medium that is irradiated by the light;

a step of emitting light from the sensor toward the print medium on which the all-ejection print pattern has been printed and obtaining an output value upon ejection that is output from the sensor;

a step of setting a threshold value between the output value upon non-ejection and the output value upon ejection; and a step of comparing the threshold value with an output value that is output from the sensor based on light that is emitted toward a print medium on which the print pattern has been printed by ejecting ink from the plurality of nozzles.

With such a determining method, the actual output values from the light-receiving section when a print block to be determined has been printed and when it has not be printed are obtained, and a threshold value used for determination is set between these obtained output values, and thus it is possible to determine more accurately whether or not ink has been ejected.

In the foregoing determining method, it is preferable that the print pattern is printed such that, when ink is ejected from all of the nozzles, a plurality of the print blocks are adjacent to one another and the periphery of the print block to be determined is surrounded by other print blocks.

If the periphery of the print block to be determined is surrounded by other print blocks, then other print blocks in addition to the print blocks to be determined are included within the region of the print medium that is irradiated by the light. In this case, the output value from the light-receiving section for when a print block to be determined has not been printed and the output value for when light is irradiated onto a print medium on which nothing has been printed are different. Thus, particularly if the periphery of the print block is surrounded by other print blocks, then by setting the threshold value based on the actual output value, it is possible to perform determination more accurately.

In the foregoing determining method, it is preferable that a plurality of the output values upon non-ejection for when only a specific print block has not been printed and a plurality of the output values upon ejection for when all of the print blocks have been printed in a specific region that is irradiated by the light are obtained, and the threshold value is set based on an average value of the output values upon non-ejection and an average value of the output values upon ejection.

With such a determining method, a plurality of output values upon non-ejection and output values upon ejection serving as base values when setting the threshold value are obtained and averaged, and thus the reliability of the threshold value is increased and therefore the precision of determination can be increased.

In the foregoing determining method, it is preferable that the specific print block and the specific region that is irradiated by the light are varied and a plurality of the output values upon non-ejection and a plurality of the output values upon ejection are obtained, and the threshold value is set based on a value obtained by averaging an average value of the output values upon non-ejection and a value obtained by averaging an average value of the output values upon ejection.

With such a determining method, the output values upon non-ejection and the output values upon ejection serving as a criterion for setting the threshold value are obtained based on different print blocks and different regions, and the threshold value is set based on an average of these, and therefore, the reliability of the threshold value can be further increased and the precision of determination can be further increased.

In the foregoing determining method, it is preferable that the nozzles are capable of ejecting a plurality of colors of ink, and the threshold value is set respectively based on each of the colors of ink.

The output values upon non-ejection and the output values upon ejection differ depending on the color of the ink forming the print blocks, and with the above determining method, the threshold values are set respectively based on the colors of the ink, and therefore, it is possible to determine whether or not ink has been ejected with high precision with respect to ink ejecting sections for ejecting ink of any color.

In the foregoing determining method, it is preferable that a light amount of the sensor is adjusted such that an output value of the sensor that has received the light reflected by a non-printed section of the print medium becomes a predetermined value.

With such a determining method, it is possible to prevent errors in detection resulting from variations in the amount of light due to individual differences between light-emitting sections or from a drop in the light amount due to temporal changes, for example.

It is also possible to achieve a computer-readable medium such as the following.

A computer-readable medium for causing a printing apparatus, which includes a plurality of nozzles for ejecting ink and a sensor for emitting light toward a print medium on which a print pattern has been printed by ejecting ink from the plurality of nozzles and receiving the light that is reflected, to operate comprises the following codes for determining whether or not ink has been ejected from the nozzles:

a code for printing a non-ejection print pattern that is made of print blocks that can be formed for each nozzle and in which only a print block to be determined, which is an object of determination, included within a region of the print medium that is irradiated by the light is not printed;

a code for emitting light from the sensor toward the print medium on which the non-ejection print pattern has been printed and obtaining an output value upon non-ejection that is output from the sensor;

a code for printing an all-ejection print pattern in which the print blocks have been printed in the entire area within the region of the print medium that is irradiated by the light;

a code for emitting light from the sensor toward the print medium on which the all-ejection print pattern has been printed and obtaining an output value upon ejection that is output from the sensor;

a code for setting a threshold value between the output value upon non-ejection and the output value upon ejection; and a code for comparing the threshold value with an output value that is output from the sensor based on light that is emitted toward a print medium on which the print pattern has been printed by ejecting ink from the plurality of nozzles.

It is also possible to achieve a printing apparatus such as the following.

A printing apparatus comprises:

a plurality of nozzles for ejecting ink;

a sensor for emitting light toward a print medium on which a print pattern made of print blocks that can be formed for each of the nozzles has been printed by ejecting ink from the plurality of nozzles and receiving the light that is reflected; and a determination section for determining whether or not ink has been ejected from the nozzles by comparing a predetermined threshold value with an output value that is output from the sensor based on light that is received by the sensor;

wherein the threshold value is set between an output value upon non-ejection and an output value upon ejection, the output value upon non-ejection being output from the sensor when only a print block to be determined, which is an object of the determination, included within a region of the print medium that is irradiated by the light is not printed, and the output value upon ejection being output from the sensor when the print blocks have been printed in the entire area of the region.

Configuration of the Printer (1) Overall Configuration

FIG. 1 is a perspective view schematically showing the primary structure of a color inkjet printer (hereinafter, referred to as "printer") 20, which serves as an embodiment of the printing apparatus of the present invention. The printer 20 has a paper stacker 22, a carry roller 24 that is driven by a motor that is not shown and carries a print paper P, which is an example of the print medium, a platen plate 26, a carriage 28, a carriage motor 30, a pull belt 32 that is driven by the carriage motor 30, and guide rails 34 for guiding the carriage 28. On the carriage 28 are mounted a print head 36, which is provided with numerous nozzles serving as ink ejecting sections arranged in a line in the carrying direction of the print paper P (hereinafter, also referred to as the "sub-scanning direction"), an optical sensor 41 serving as determining means for determining whether or not ink has been ejected, and a linear encoder 29 for reading a code plate 33. A rotary encoder 25 is provided on the shaft of the carry roller 24, and the amount that the print paper P is carried is controlled based on the output of the rotary encoder 25. Thus, the position of the carriage 28 in the direction (which is also referred to herein as the "main-scanning direction") that is substantially perpendicular to the carrying direction of the print paper can be detected by the linear encoder 29, and the position of the print paper P can be detected by the rotary encoder 25. That is, the printer 20 is configured such that the relative position between the carriage 28 and the print paper P can be accurately recognized based on the output signals of the encoders 25 and 29.

The print paper P is fed from the paper stacker 22 by a paper feed roller that is not shown and is carried by the carry roller 24 and sent over the surface of the platen plate. 26 in the sub-scanning direction SS. The carriage 28 is pulled by the pull belt 32, which is driven by the carriage motor 30, and moved in the main-scanning direction MS along the guide rails 34. The main-scanning direction MS and the sub-scanning direction SS are substantially perpendicular.

Figure 2:
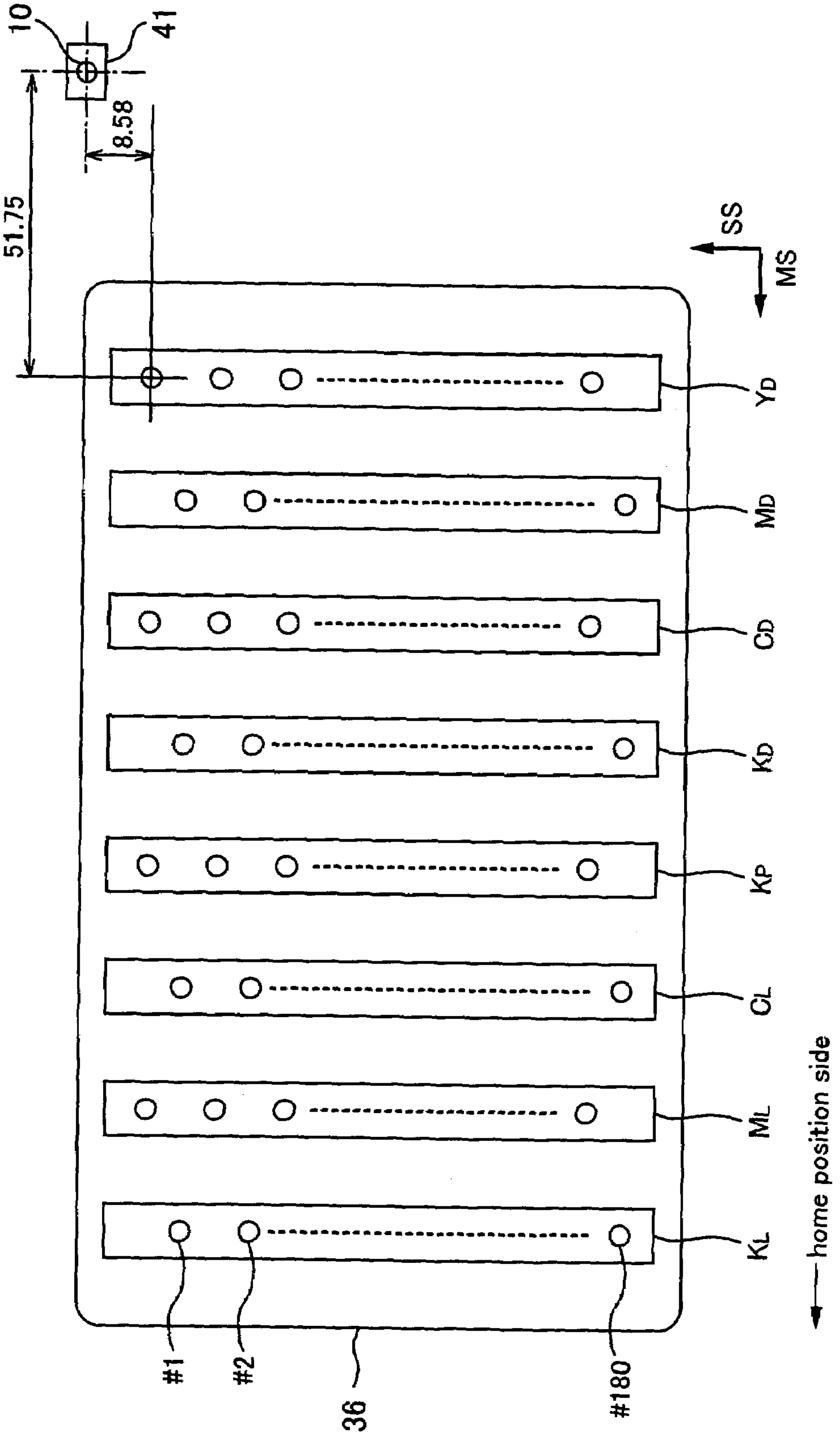
FIG. 2 is a diagram showing the arrangement of the nozzles and the optical sensor when the print head 36 is viewed from above.

FIG. 2 is a diagram showing the arrangement of the nozzles and the optical sensor 41 when viewing the print head 36 from above. The print head 36 is provided with a light black ink nozzle row KL for ejecting light black ink, a light magenta ink nozzle row ML for ejecting light magenta ink, a light cyan ink nozzle row CL for ejecting light cyan ink, a photo black ink nozzle row KP for ejecting black ink that is used primarily when printing natural images, a dark black ink nozzle row KD for ejecting dark black ink, a dark cyan ink nozzle row CD for ejecting dark cyan ink, a dark magenta ink nozzle row MD for ejecting dark magenta ink, and a yellow ink nozzle row YD for ejecting yellow ink. In this example, the first nozzle #1 is arranged on the downstream side in the carrying direction of the print paper P.

The optical sensor 41, which is mounted on the carriage 28, is arranged on the side opposite from the home position and more downstream in the carrying direction than the first nozzle #1 of the yellow ink nozzle row YD, which is positioned on the side furthest from the home position of the print head 36. In this example, the optical sensor 41 is provided at a position that is 8.58 mm downstream in the carrying direction, and 51.75 mm on the side opposite the home position, from the first nozzle.

A cleaning mechanism 200 is provided below the print head 36 mounted to the carriage 28 within the range of movement of the carriage 28, which is moved along the guide rails 34, but outside the printing region. It should be noted that in FIG. 1, only a head cap 210 of the cleaning mechanism 200 is shown, and the other aspects of its configuration are not shown.

The head cap 210 is an airtight cap that covers the print head 36 when not printing to keep the ink within the nozzles from drying. For this reason, the head cap 210 is provided at a standby position, or the so-called home position side, of the carriage 28. The head cap 210 also covers the print head 36 if the nozzles become clogged and performs cleaning by sucking out ink from the nozzles. The optical sensor 41 for determining whether or not ink has been ejected is described in greater detail later.

Figure 3:
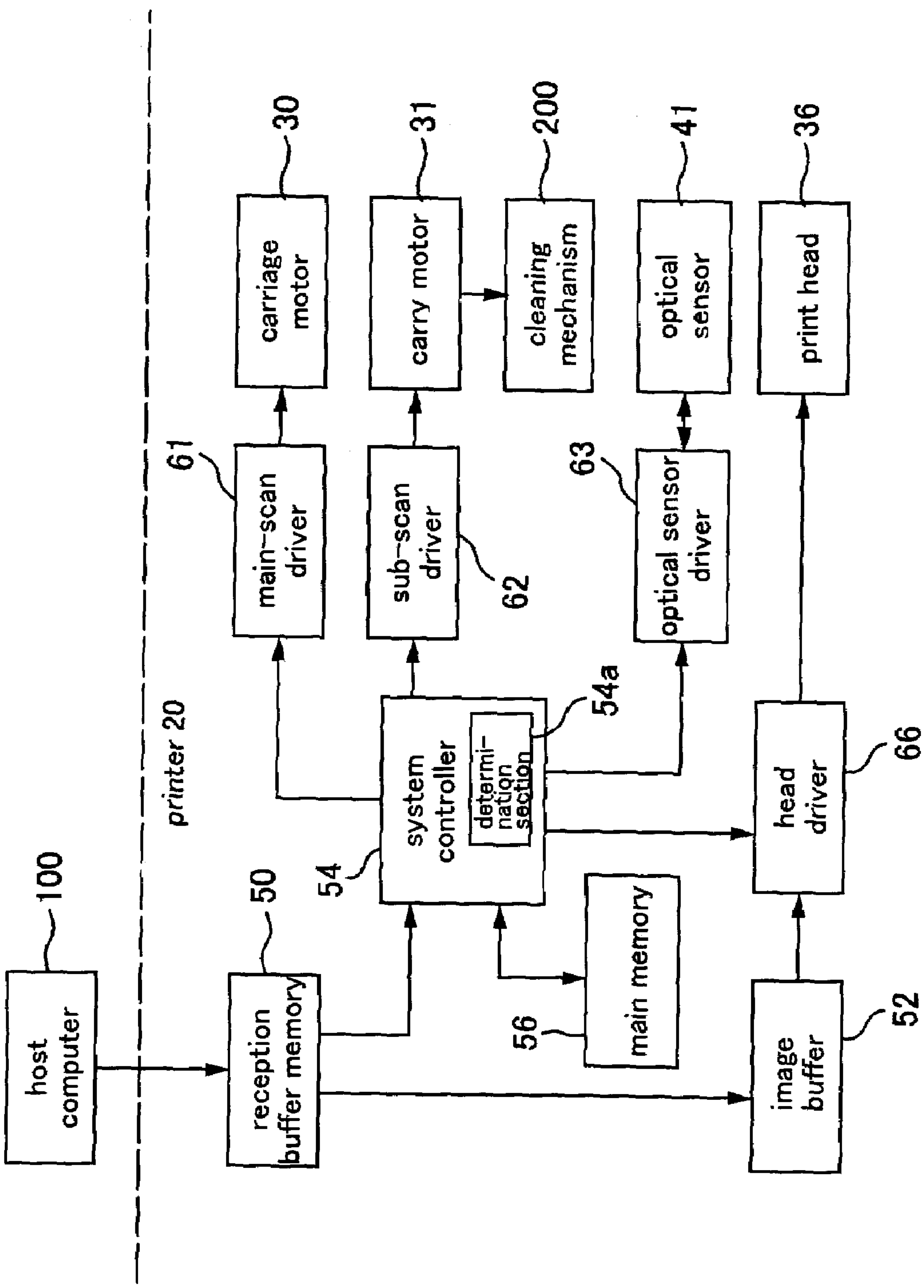
FIG. 3 is a block diagram showing the electrical configuration of the printer 20.

FIG. 3 is a block diagram showing the electrical configuration of the printer 20. The printer 20 is provided with a reception buffer memory 50 for receiving signals supplied from a host computer 100, an image buffer 52 for storing print data, a system controller 54 for controlling the overall operation of the printer 20, and a main memory 56.

The system controller 54 is connected to a main-scan driver 61 for driving the carriage motor 30, a sub-scan driver 62 for driving the carry motor 31, an optical sensor driver 63 for driving the optical sensor 41, and a head driver 66 for driving the print head 36.

The optical sensor driver 63 has light amount control means capable of adjusting the amount of light that is emitted from a light-emitting section 41*a* of the optical sensor 41, and output control means capable of adjusting the output of a light-receiving section 41*b*. Thus, for example, it is possible to adjust the amount of light that is emitted from the light-emitting section 41*a* or the output of the light-receiving section 41*b* such that the output of the light-receiving section 41*b* that receives the light reflected by a predetermined print paper, for example, becomes a predetermined value.

A printer driver (not shown) of the host computer 100 sets the various parameter values regulating the printing operation based on the print mode (fast print mode, high-quality print mode, etc.) that has been selected by a user. This printer driver also creates print data for performing this printing based on these parameter values, and transfers the print data to the printer 20. The print data that have been transferred are temporarily held in the reception buffer memory 50. In the printer 20, the system controller 54 reads necessary information from the print data held in the reception buffer memory 50, and based on this information, sends control signals to the drivers.

The image buffer 52 stores print data of a plurality of color components obtained by dividing the print data received at the reception buffer memory 50 into each of its color components. The head driver 66 reads the print data of each of the color components from the image buffer 52 in accordance with control signals from the system controller 54, and drives the respective color nozzle rows provided in the print head 36 in correspondence with this print data. It should be noted that the various sections of the printer 20 are controlled by the system controller 54.

It is also possible for the print data transferred from the host computer 100 to be divided into each of its color components by the host computer 100.

(2) Configuration of the Optical Sensor

Figure 4A:
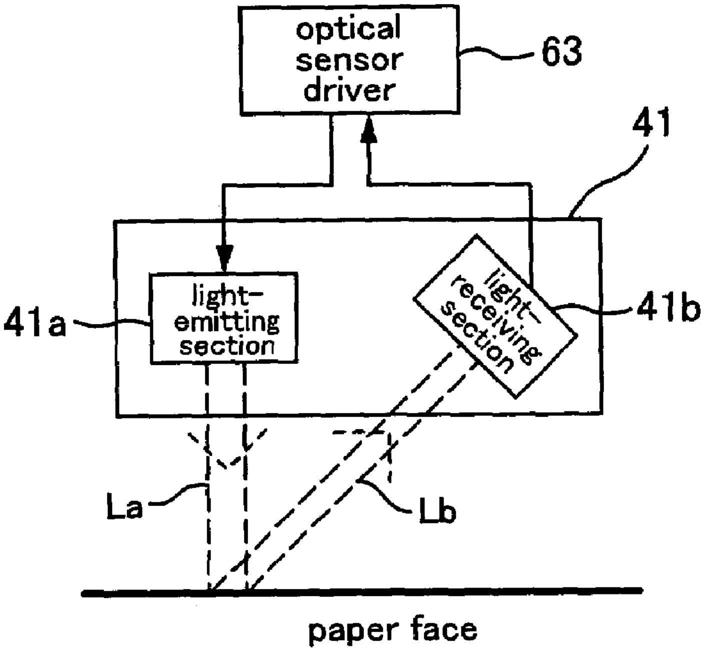
FIG. 4A is an explanatory diagram showing the configuration of the light-emitting section according to an embodiment of the present invention in an example where the light-emitting section is provided at a position that is perpendicular to the print paper, which serves as a print medium.
Figure 4B:
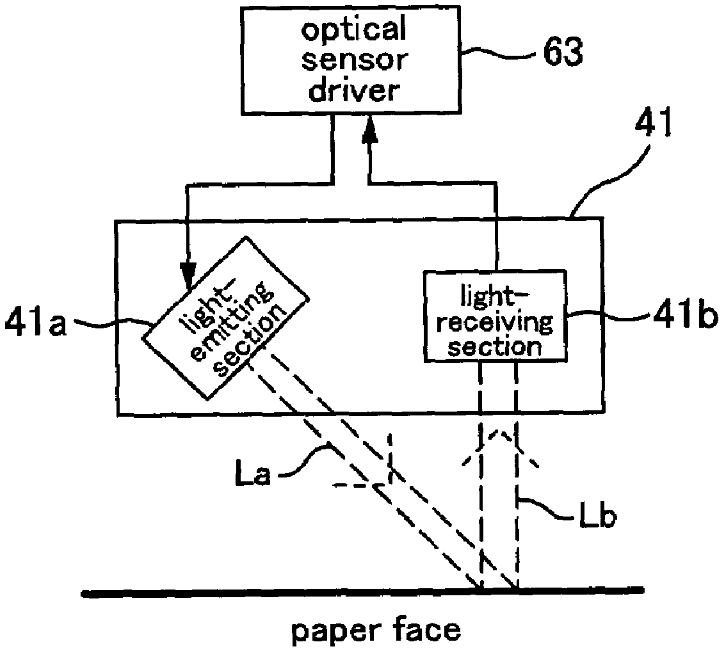
FIG. 4B is an explanatory diagram showing the configuration of the light-emitting section in an example where the light-emitting section is provided at a position where it emits light obliquely with respect to the print paper.

FIG. 4 is an explanatory diagram showing how the optical sensor 41 operates in this embodiment of the present invention. FIG. 4A is a diagram showing an example in which the light-emitting section is provided at a position that is perpendicular to the print paper, which serves as the print medium, and FIG. 4B is a diagram showing an example in which the light-emitting section is provided at a position where it emits light at an angle to the print paper face.

The optical sensor 41 for determining whether or not ink has been ejected from a nozzle is provided with the light-emitting section 41*a* and the light-receiving section 41*b* as shown in FIG. 4. This embodiment illustrates an example in which a single light-receiving section 41*b* for receiving primarily the diffused reflection components of the reflected light is provided, but it is also possible to adopt a configuration in which a separate light-receiving section for receiving primarily the regular reflection components of the reflected light is provided.

The light-emitting section 41*a* is a light-projecting means for emitting light toward the print paper. That is, at the time of ink ejection determination, the light-emitting section 41*a* emits light toward a region of the print paper on which a print pattern having print blocks each formed corresponding to a nozzle should be printed by ink ejected from the nozzles. In this embodiment, a spot 10 is set such that one print block BL of the print pattern is included within the region (hereinafter, referred to as "spot") of the print paper that is irradiated which by the light emitted from the light-emitting section 41*a*. The print pattern is described in detail later.

Examples of a light-emitting member include a light-emitting diode, a laser diode, and an incandescent lamp. The color of the light-emitting member is preferably a color that is complementary to the color of the print image subjected to determination, such as the print pattern. For example, it is possible to use a red light-emitting member to detect cyan printed images, to use a green light-emitting member to detect magenta printed images, and to use a blue light-emitting member to detect yellow printed images. When the color of the light-emitting member and the color of the printed image are complementary, then the level of the output signal can be made noticeably higher than when they are not complementary.

In view of the above, to obtain an output that is stable for a printed image of any color, it is preferable that a white light-emitting member is used, as far as circumstances permit.

The light-receiving section 41*b* is a photoelectric conversion means for receiving reflection light that has been reflected from the print pattern. Examples of this light-receiving element include a photodiode and a phototransistor. Preferably, the light-receiving element has good sensitivity properties with respect to visible light.

As shown in FIG. 4, the position of the light-receiving section 41*b* for receiving primarily the diffused reflection components is preferably not the position of regular reflection with respect to the light-emitting section 41*a*, and as shown in FIG. 4A, it is possible for the light-emitting section 41*a* to be attached to a position where it is perpendicular to the paper face and for the light-receiving section 41*b* to be attached oblique to the paper face, or as shown in FIG. 4B, it is also possible for the light-emitting section 41*a* to be attached oblique to the paper face and for the light-receiving section 41*b* to be attached at a position where it is perpendicular to the paper face. In the case of print media whose surface has a coating layer, such as glossy print paper in particular, most of the light that is incident is regular-reflected by the coating layer on the surface, but if the light-emitting section 41*a* and the light-receiving section 41*b* are not attached at the position of regular reflection, then the color of the print blocks below the coating layer also can be reliably determined.

The light that is emitted from the light-receiving section 41*a* is reflected by the print paper on which the print blocks have been printed, and the diffused reflection component of that reflection light arrives at the light-receiving section 41*b*. The light-receiving section 41*b* outputs an output signal that corresponds to the amount of light that is received. If this output signal is smaller than a threshold value that has been set in advance, then it is determined that ink has been ejected normally from the nozzle that should form the print block to which the light emitted by the light-emitting section 41*a* has been irradiated, and if the output signal is larger than the threshold value, then it is determined that ink was not ejected from that nozzle.

Figure 5:
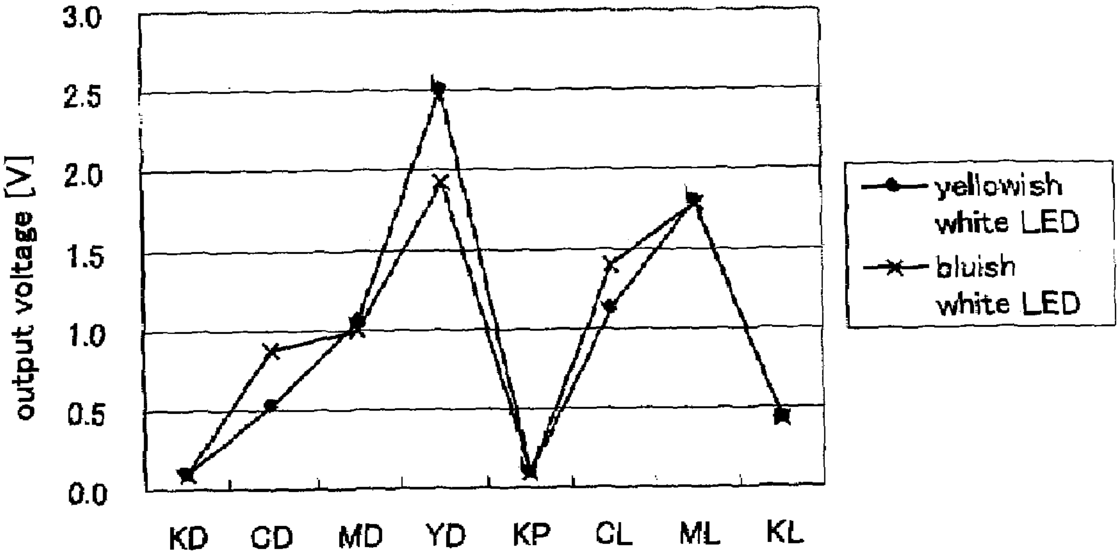
FIG. 5 is a diagram showing the individual differences between optical sensors with white light-emitting members.

As regards the optical sensor 41, for example, the amount of light emitted by the light-emitting section 41*a* is adjusted by the light amount control means, or the output of the light-receiving section 41*b* is adjusted by the output control means, which are controlled by the system controller 54, such that the output of the light-receiving section 41*b* that receives the light reflected by predetermined print paper on which nothing has been printed or by various color print patterns, for example, becomes a predetermined value. FIG. 5 is a diagram showing the individual differences between optical sensors with a white light-emitting member. Even in the case of white light-emitting members, there are individual differences, and here the output values when print patterns printed with various color inks are irradiated using a yellowish white LED and a bluish white LED. As shown in the diagram, the output values are different between these two light-emitting members particularly when light is irradiated onto yellow, cyan, and magenta print patterns. Thus, the output of the light-receiving section is adjusted using an optical sensor that is actually installed and the print patterns printed with ink that is actually used on a print medium that is actually used for printing, such that it is possible to prevent incorrect determinations that can result from individual differences between light-emitting members, differences between print media, and differences between the ink colors, for example.

Description of the Determination Print Pattern Used for Ink Droplet Ejection Determination The print pattern is described before proceeding to description of ink droplet ejection determination.

Figure 6:
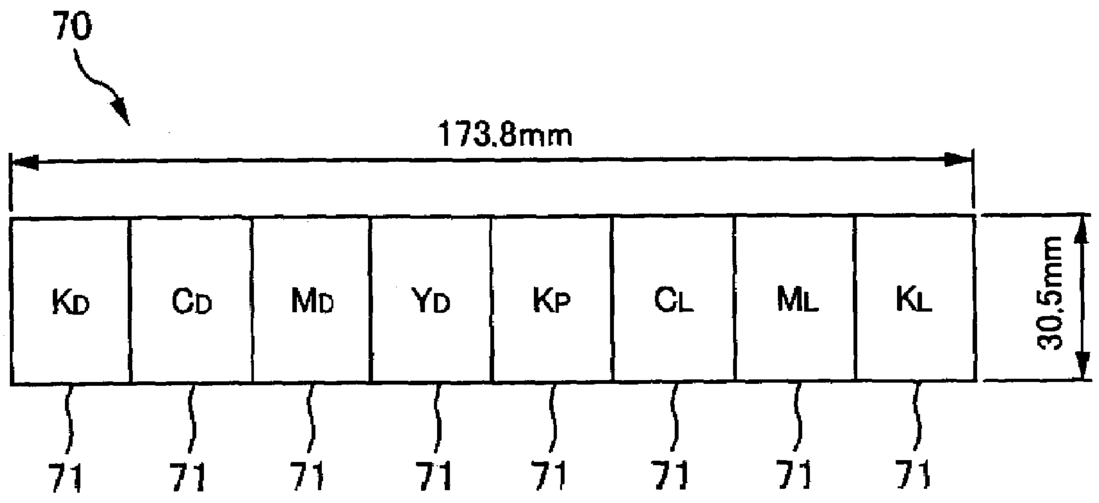
FIG. 6 is a conceptual diagram showing an entire print pattern group 70 used to determine whether or not ink has been ejected.
Figure 7:
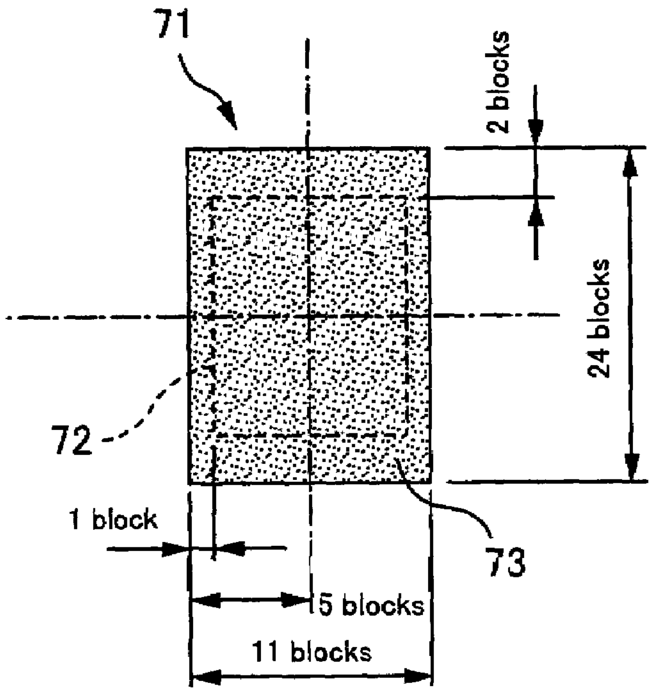
FIG. 7 is a conceptual diagram of a single print pattern making up the print pattern group.
Figure 8:
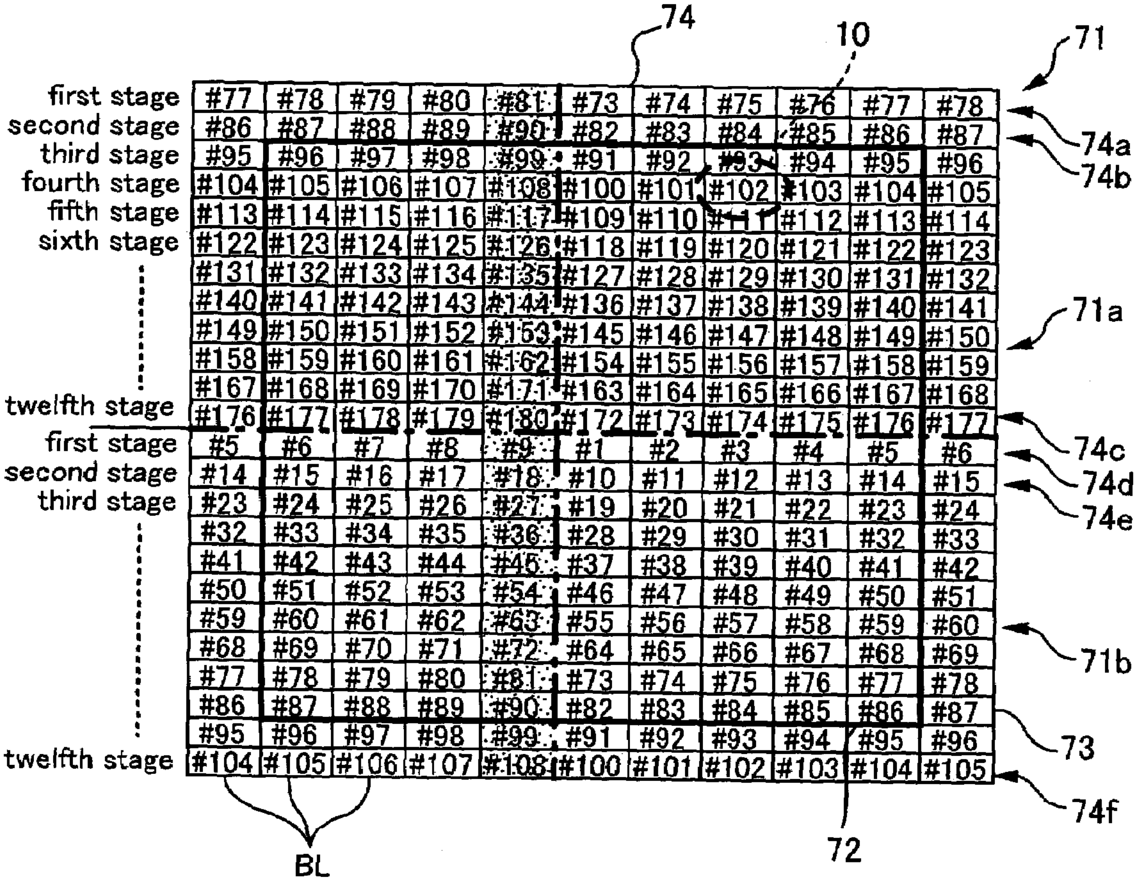
FIG. 8 is a diagram for describing the nozzles for printing the various areas of the print blocks.

FIG. 6 is a conceptual diagram of an entire print pattern group 70 used to determine whether or not ink has been ejected, FIG. 7 is a conceptual diagram of a single print pattern 71 of the print pattern group 70, and FIG. 8 is a diagram for describing the nozzles printing the various areas within the print blocks BL in a print pattern formed by ink of a certain color (for example, black).

The print pattern 71 is made of a plurality of print blocks BL, each of which being formed by ink ejected from a respective nozzle, with a single print block BL being formed by a plurality of ink dots. A single print block BL is used for determination of a single nozzle. Also, each of the print patterns 71 is formed by a nozzle row ejecting the respective color inks. That is, to determine the ink ejection state of all nozzles for ejecting a plurality of ink colors, the same number of print patterns as the number of colors of ink ejected from the nozzles of the print head 36 are formed, and in the present embodiment, a print pattern group 70 in which eight print patterns are arranged in the main-scanning direction is printed.

In the print pattern group 70, the print patterns are arranged adjacent to one another in the main-scanning direction such that the most upstream positions and the most downstream positions, in the carrying direction, of each of the print patterns 71 formed by the respective color inks match one another.

Each print pattern 71 is made of a pattern to be determined 72 that is the object of ink droplet ejection determination and that is formed in a block region for determination, and a complementary block region 73, which is made of print blocks formed adjacent to the outer periphery portion of the pattern to be determined 72, for improving determination accuracy. More specifically, as described above, Each print pattern 71 is set such that a single print block BL is included within the spot 10 irradiated by the light emitted from the light-emitting section 41*a*. Therefore, within the spot 10, there are a single print block BL to be determined, and a region surrounding that print block BL. Consequently, the amount of reflection light is different, and thus an error in detection tends to occur, between when a specific print block BL to be determined has its periphery surrounded by other print blocks and when specific print block is positioned, for example, at an end or corner portion of the print pattern 71 and is not surrounded by other print blocks BL. To prevent such an error in detection, the complementary block region 73 is provided such that all print blocks BL to be determined are arranged surrounded by other print blocks BL. FIG. 8 shows a print pattern formed by a nozzle row having 180 nozzles.

In the pattern to be determined 72 in each print pattern 71, nine print blocks BL lined up in the main-scanning direction are formed in 20 stages in the sub-scanning direction. The print patterns 71 are arranged adjacent to one another in the main-scanning direction such that the most upstream positions and the most downstream positions, in the carrying direction, of the print blocks BL lined up in the main-scanning direction match one another. The complementary block region 73 is formed on the outer periphery portion of the pattern to be determined 72, that is, it is made of one row, aligned in the sub-scanning direction, of print blocks BL on both sides in the main-scanning direction of the pattern to be determined 72, and two stages of print blocks BL on both the most upstream and most downstream side in the carrying direction. The print blocks BL of the complementary block region 73 are printed by some of the nozzles forming the print blocks BL that make up the pattern to be determined 72.

In the print pattern group 70, which is made of eight print patterns 71, each print pattern 71 is formed respectively by ejecting ink in each scan of the carriage 28 from nozzles arranged at the same positions in the sub-scanning direction in the respective nozzle rows. That is, as regards the eight print patterns 71, in each scan of the carriage 28, the same sites in the print patterns for determination 71, which are lined up in the main-scanning direction, are printed by the same method. Thus, a method for printing a single print pattern for determination 71 is described below.

Each print pattern 71 is printed divided into half regions in the sub-scanning direction, for example, in order to print the complementary block region 73. In this example, each nozzle row has 180 nozzles and nine print blocks are formed in the main-scanning direction, and therefore, 20 stages of print blocks BL are formed in the sub-scanning direction for the pattern to be determined 72. In other words, each print pattern 71 including the complementary blocks 73 is made of 24 stages of print block arrays 74 provided in the carrying direction, each print block array being made of eleven print blocks BL in the main-scanning direction.

The print pattern 71 is printed partitioned into a downstream side block array group 71*a* made of 12 stages of block arrays 74 taking up the half on the downstream side in the carrying direction, and an upstream side block array group 71*b* made of 12 stages of block arrays 74 taking up the half on the upstream side in the carrying direction. The nozzles for printing the downstream side block array group 71*a* are the 108 nozzles (12 stages×9 blocks) positioned on the upstream side, in the carrying direction, of the nozzles of the nozzle row.

The first stage print block array 74*a* positioned on the most downstream side in the carrying direction of the downstream side block array group 71*a* is printed by the nozzles from the 81st nozzle #81 to the 73rd nozzle #73 arranged consecutively, the second stage print block array 74*b* is printed by the nozzles from the 90th nozzle #90 to the 82nd nozzle #82 arranged consecutively, and thereafter the nozzles are employed in the same fashion, with a twelfth stage print block array 74*c* being printed by the nozzles from the 180th nozzle #180 to the 172nd nozzle #172 arranged consecutively.

Here, for the sake of convenience, the printing operation for printing the first stage print block array 74*a* is described. It is assumed that all of the nozzles are in a state where they are capable of ejecting ink.

Figure 9:
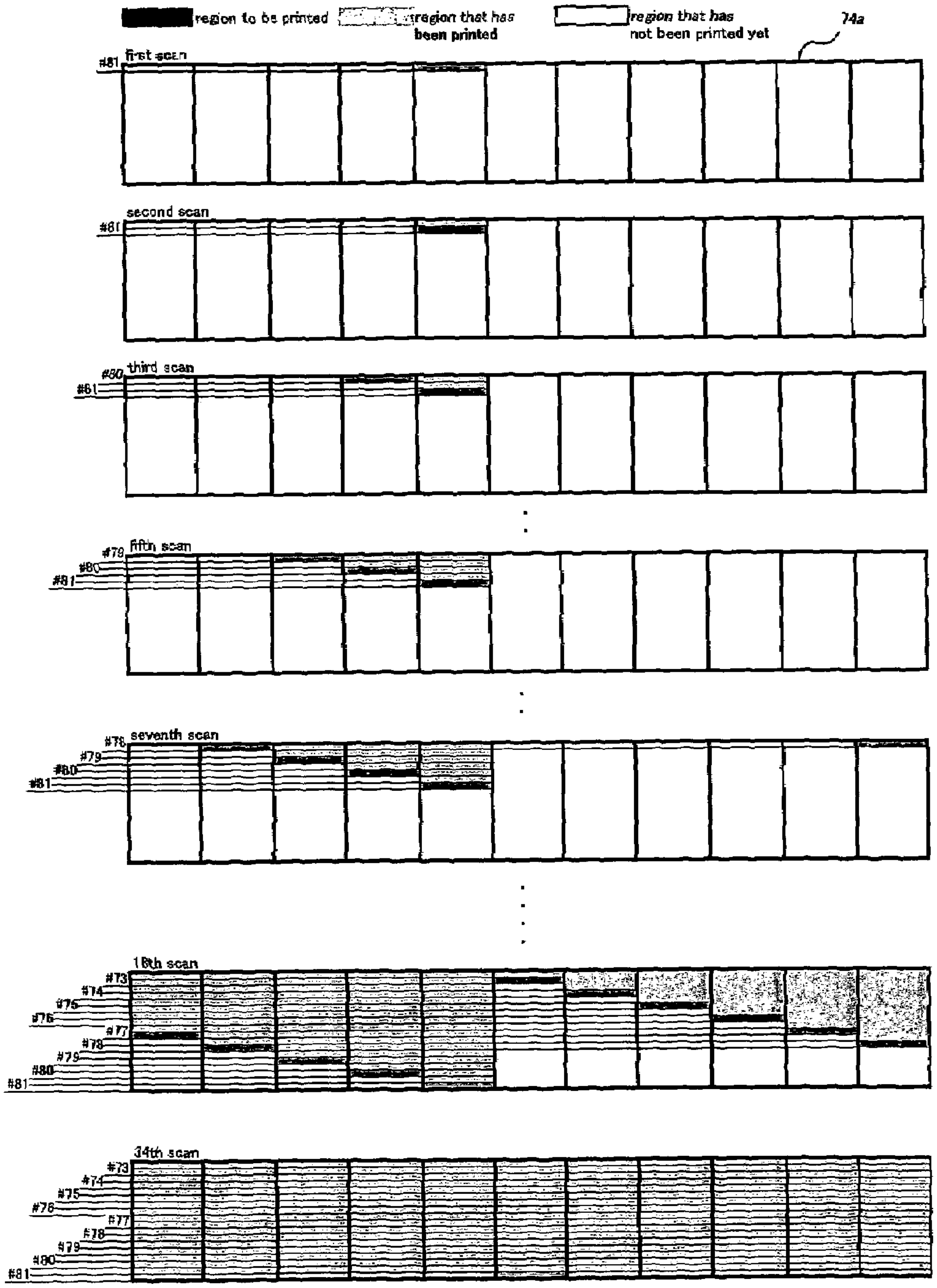
FIG. 9 is a diagram for describing how a first stage print block array is printed.

FIG. 9 is a diagram for describing how the first stage print block array 74*a* is printed. FIG. 9 shows a dot row or a line formed in a single scan of the carriage 28, and the numbers appended to the left indicate the nozzle number.

First, the print paper is carried until the position on the most downstream side of the print region in which the print pattern for detection 71 is printed reaches the position in opposition to the 81st nozzle, from which printing is started, of the print block array 74 positioned most downstream. Then, as shown in FIG. 9, a first scan of the carriage 28 is performed, and when the carriage 28 is positioned at a predetermined position, ink is ejected from the 81st nozzle to form a dot row or line at the most downstream side position of the region of #81 shown in FIG. 8. When the first scan of the carriage 28 is over, the print paper is carried by half of the nozzle pitch, and in a second scan of the carriage 28, ink is ejected from the 81st nozzle to form a new dot row or line adjacent in the sub-scanning direction to the dot row or line formed in the first scan.

When the second scan of the carriage 28 is over, the print paper is carried by half of the nozzle pitch. At this time, the print paper is carried such that the dot row or line to be formed by the 80th nozzle #80 is in the same position, in the carrying direction, as the most downstream side dots already formed by the 81st nozzle #81. In the third scan of the carriage 28, ink is ejected from the 81st nozzle #81 and the 80th nozzle #80. At this time, a new dot row or line is formed adjacent in the sub-scanning direction to the dot row or line formed in the second scan by the ink ejected from the 81st nozzle. Also, a dot row or line is formed at a position on the most downstream side of the region of #80 shown in FIG. 8 by the ink ejected from the 80th nozzle. Then, the print paper is carried by half of the nozzle pitch, and in a fourth scan of the carriage 28, ink is ejected from the 81st nozzle and the 80th nozzle to form new dot rows or lines adjacent in the sub-scanning direction to the dot rows or lines formed in the third scan. In this fashion, the carriage is scanned and the print paper is carried to form two dot rows or lines, and per every two scans, a nozzle for ejecting ink is added one by one from the upstream side in the carrying direction, and thus it is possible to execute printing such that the most downstream side positions of the print blocks arranged in the sub-scanning direction match one another.

Then, in the 18th scan, the last of the dots is formed in the region of #81 of FIG. 8. Thus, in the 19th scan, ejection of ink from the 81st nozzle is stopped. Thereafter, per every two scans, the ejection of ink is stopped one nozzle at a time in order from the nozzle positioned most upstream in the carrying direction. Then, in the 34th scan, the last of the print blocks BL making up the print block array 74 is formed. By performing printing in this manner, it is possible to execute printing such that the positions on the most upstream side of the print blocks arranged in the sub-scanning direction match one another.

The foregoing description was of the printing operation for printing the first stage print block array 74*a* positioned on the most downstream side, but the print block arrays 74 of the other stages are printed in the same manner and at the same time as the first stage print block array 74*a*. In other words, the nozzles in one nozzle row are divided into sub-nozzle rows, which are each made of a plurality of consecutive nozzles, as the nozzles for forming each stage of the print block arrays 74, and control is performed such that ink is ejected at the same timing from each nozzle arranged at the same position in the sub-scanning direction in each sub-nozzle row. At this time, the nine nozzles making up each sub-nozzle row are controlled such that ink is ejected in the order from the nozzle, of those nine nozzles, that is positioned most upstream. That is, focusing on two print block arrays 74 that are adjacent to each another in the sub-scanning direction, the nozzle forming the first print block formed first in the upstream-side print block array is the ninth nozzle counting from the nozzle that forms the first print block formed first in the downstream-side print block array. By controlling the nozzles in this manner, ink is ejected at the same timing from, for example, nozzle #81, nozzle #90, nozzle #99, nozzle #108, nozzle #117, nozzle #126, nozzle #135, nozzle #144, nozzle #153, nozzle #162, nozzle #171, and nozzle #180, forming twelve dot rows or lines with a suitable spacing between them in the sub-scanning direction that correspond to the respective stages of print block arrays 74. The downstream side block array group 71*a* on the downstream side half is printed in 34 scans of the carriage 28.

The first stage print block array 74*d* positioned on the most downstream side of the upstream side block array group 71*b* is printed by the nozzles from the ninth nozzle #9 to the first nozzle #1, the second stage print block array 74*e* is printed by the nozzles from the 18th nozzle #18 to the tenth nozzle #10, and the twelfth stage print block array 74*f* is printed by the nozzles from the 108th nozzle #108 to the 100th nozzle #100.

When the downstream side block array group 71*a* has been printed, the print paper is carried to the position for printing the upstream side block array group 71*b*. At this time, the print paper is carried until it reaches a position where the dots formed by the ink that is ejected from the ninth nozzle, from which printing starts, of the print block array 74*d* positioned on the most downstream side are formed positioned adjacent in the sub-scanning direction to the dot row or line positioned on the most upstream side in the twelfth stage print block array 74*c* of the downstream side block array group 71*a*. The subsequent operation for printing the upstream side block array group 71*b* is the same as the operation for printing the downstream side block array group 71*a*.

Also, the dots forming each of the print blocks are formed at an equal pitch, even between adjacent print blocks, such that blank areas are not left between print blocks.

In this embodiment, a print pattern 71 is illustratively shown formed by 24 stages of print block arrays 74 in the sub-scanning direction, each having eleven print blocks in the main-scanning direction, but there is no limitation to this regarding the number of print blocks making up the print block arrays 74 or the number of stages of the print block arrays 74, and it is also possible for these to be suitably set in accordance with the number of nozzles, the size of the print blocks, and the size of the print medium.

In this embodiment an example was described in which each of the print patterns 71 is printed divided in half in the carrying direction of the print paper, but it is also possible to use all of the nozzles initially to print 20 stages of print block arrays and then to use four stages of nozzles positioned on the downstream side, among the nozzles of the nozzle row, that is, to use 36 nozzles, to print four stages of print block arrays on the upstream side of these 20 print block arrays. Also, there is no limitation to the above arrangement in the main-scanning direction of the print blocks making up the print block arrays.

Ink Droplet Ejection Determining Method

At the time of determination, the optical sensor 41 attached to the carriage 28 (FIG. 1) and the print paper P are moved relative to one another and the print blocks BL are scanned over by the optical sensor 41. At this time, an emitted light La (FIG. 4) from the light-emitting section 41*a* of the optical sensor 41 hits a print block, reflection light Lb from the print block is received by the light-receiving section 41*b*, and the electrical signal output from the light-receiving section 41*b* is compared with a predetermined threshold value to determine whether or not ink has been ejected.

The optical sensor 41 is arranged more downstream than all of the nozzles of the print head 36, and thus, for a predetermined print block BL, whether or not ink has been ejected is determined in parallel with movement of the carriage 28 when printing a portion of the upstream side block array group 71*b*.

Figure 10:
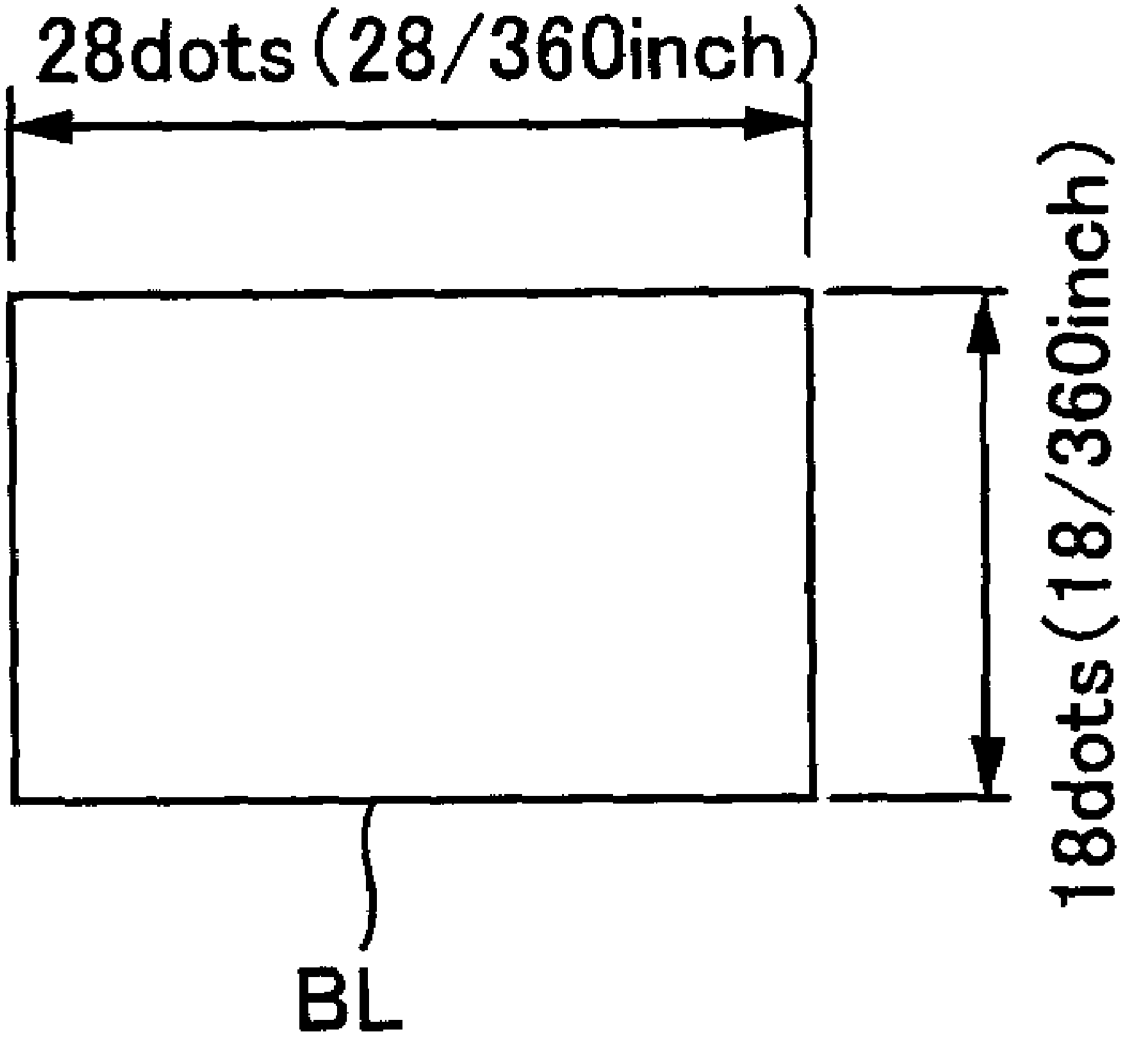
FIG. 10 is a diagram showing an example of the size of the print blocks making up the print patterns.
Figure 11:
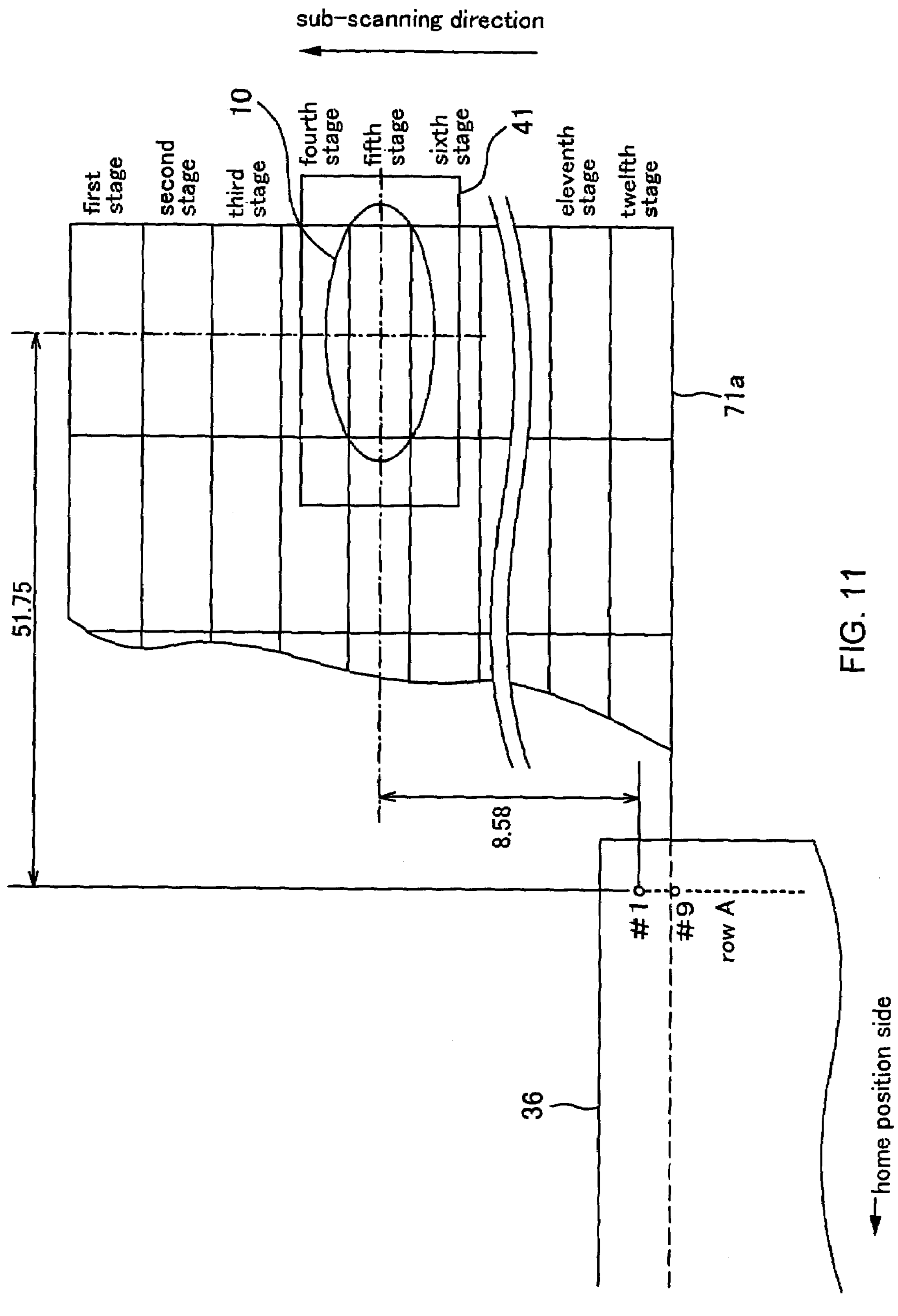
FIG. 11 is a diagram for describing the relative position between the optical sensor and the print pattern when printing the upstream side block array group.

FIG. 10 is a diagram showing an example of the size of the print blocks BL making up the print patterns 71 used in the present embodiment, and FIG. 11 is a diagram for describing the relative position between the downstream side half of the print pattern 71*a* and the optical sensor 41 when printing the upstream side half of the print pattern 71*b*.

As shown in FIG. 10, the resolution in both the main-scanning direction and the sub-scanning direction of the print blocks is 360 dpi, and the print blocks are printed at a size of 28 dots (*frax*;28;360 *inch*) in the *main-scanning* direction and 18 dots (*frax*;18;360 *inch*) in the *sub-scanning direction*. T*herefore*, in the case of the present embodiment in which the yellow ink nozzle row YD and the optical sensor 41 are in the above positional *relationship*, the optical sensor 41 scans the fifth and sixth stage print block arrays 74 in the downstream side block array group 71*a* when printing the upstream side block array group 71*b* as shown in FIG. 11. Thus, after the downstream side block array group 71*a* has been printed, the first to fourth stage print block arrays 74 in the downstream side block array group 71*a* are scanned by the optical sensor 41 to determine whether or not ink has been ejected. Then, when printing the upstream side block array group 71*b*, the optical sensor 41 scans the fifth and sixth stage print block arrays 74 in the downstream side block array group 71*a* to determine whether or not ink has been ejected. Next, after the upstream side block array group 71*b* has been printed, the print block arrays 74 of the seventh stage and after in the downstream side block array group 71*a* and the upstream side half of the print pattern 71*b* are scanned to determine whether or not ink has been ejected.

Figure 12:
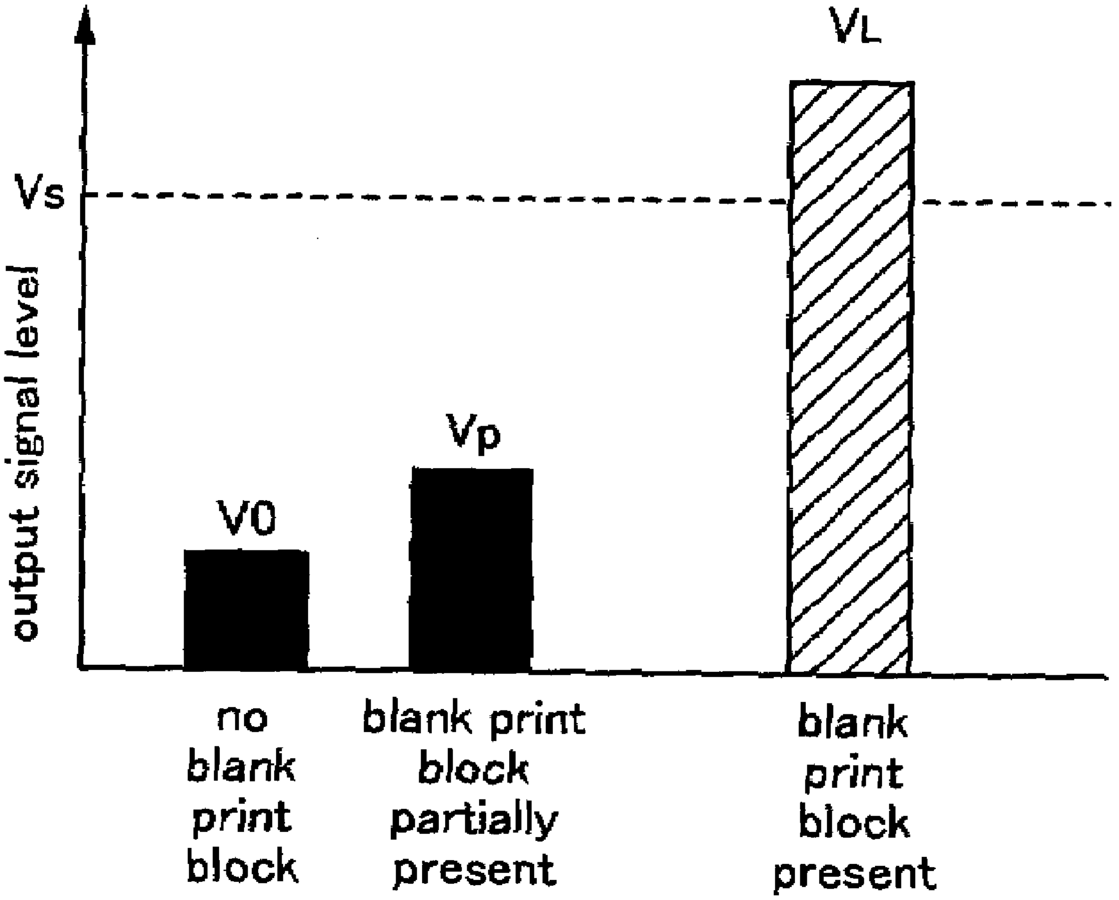
FIG. 12 is an explanatory diagram showing the relationship between the output signal of the optical sensor 41 and a threshold value Vs.

The apparatus has been set such that a single block BL fits within the spot 10 (see FIG. 8). For example, if there is a nozzle from which an ink droplet has not been ejected, then the print block BL corresponding to that nozzle will not have been formed, leaving a blank spot on the print paper. If the print block BL within the region of the spot 10 is blank, then the amount of reflection light Lb that is received by the light-receiving section 41*b* of the optical sensor 41 increases, and thus the output signal level increases. Therefore, the output signal in a case where the nozzle that should have formed the print block BL within the region of the spot 10 did not eject ink is defined as VL as shown in FIG. 12. Meanwhile, the output, whose signal level is Vp, for a case where a portion of a blank print block is within the spot 10 is greater than the output signal level V0, where no blank print block BL is within the spot 10. Thus, as shown in FIG. 12, by setting the threshold value Vs to between Vp and VL, it is possible to accurately determine whether or not ink has been ejected from the nozzle corresponding to a print block completely included in the spot 10.

A determination section 54*a* of the system controller 54 (FIG. 3) compares the output signal level from the optical sensor 41 with the threshold value Vs stored in advance in the main memory 56 in order to determine whether or not ink has been ejected. If the output signal level is smaller than Vs, then the print block included within the region of the spot 10 has been formed, and it is determined that ink has been ejected from the nozzle for forming that print block. Conversely, if the output signal level is greater than Vs, then the print block included within the spot 10 has not been formed, and it is determined that ink has not been ejected from the nozzle that should have formed that print block.

The printer 20 is configured such that a single print block is included within the region of the print paper that is irradiated by the light emitted from the light-emitting section 41*a*, such that based on the output of the linear encoder 29 and the output of the rotary encoder 25 it is possible to recognize the relative position between the carriage 28 and the print paper, and moreover such that the arrangement between the nozzles and the optical sensor 41, which is provided more downstream in the carrying direction than all of the nozzles, can be accurately adjusted in terms of their positions. Thus, if the carriage 28 is scanned to determine whether or not ink has been ejected and the optical sensor 41 detects nozzles from which ink has not been ejected, then it is possible to specify those nozzles from which ink has not been ejected based on the output of the linear encoder 29 and the rotary encoder 25. It is then possible to restore the nozzles to a favorable state by performing flushing etc. with respect to only the specified nozzles that do not eject ink, or to perform printing by using nozzles other than those nozzles that do not eject ink to form the dots that should have been formed by those nozzles.

Method for Determining the Threshold Value

As regards the output value of the light-receiving section 41*b* according to the reflection light of the light emitted toward the print medium from the light-emitting section 41*a* of the optical sensor 41, the output value from the light-receiving section differs depending on, for example, the material or the coloring of the print medium, and the color of the ink used or the bleeding of the printed ink in printed print media. Therefore, it is preferable to set the threshold values to correspond to the combination of the material and the coloring of the print medium, and the ink color, for example.

An example is described below in which a print pattern for determining whether or not ink has been ejected is printed using the print medium and ink that will be used in practice in order to perform determination more accurately, the outputs from the light-receiving section 41*b* when an ink block to be detected of the print pattern has been printed and when it has not been printed are detected, and the threshold value is set based on these output values. In this example, whether or not ink has been ejected from the nozzles for ejecting dark black ink is determined and white print paper is used as the print medium, but the following description can also be applied for a case in which the threshold values have been set for each combination of the material and the coloring of the print paper, and the ink color, for example.

Figure 13:
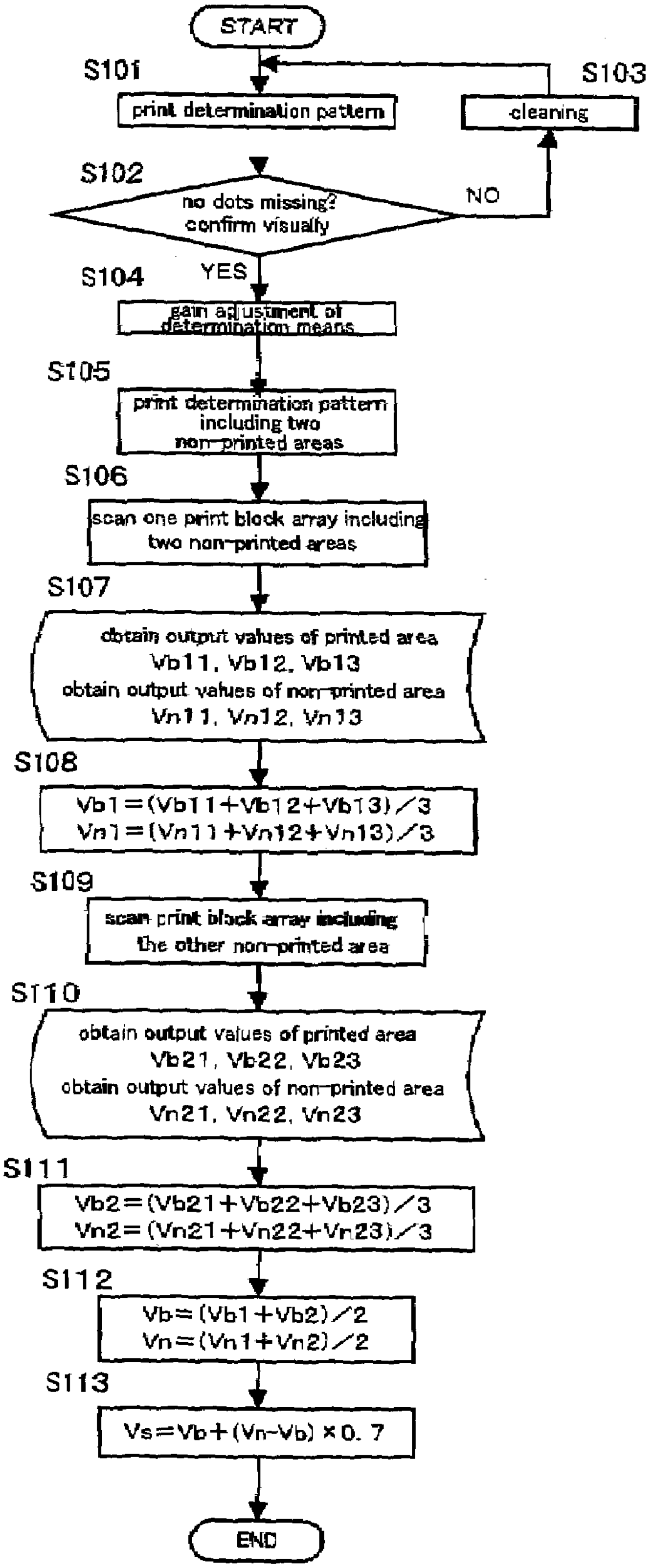
FIG. 13 is a flowchart showing the procedure for setting the threshold value.
Figure 14:
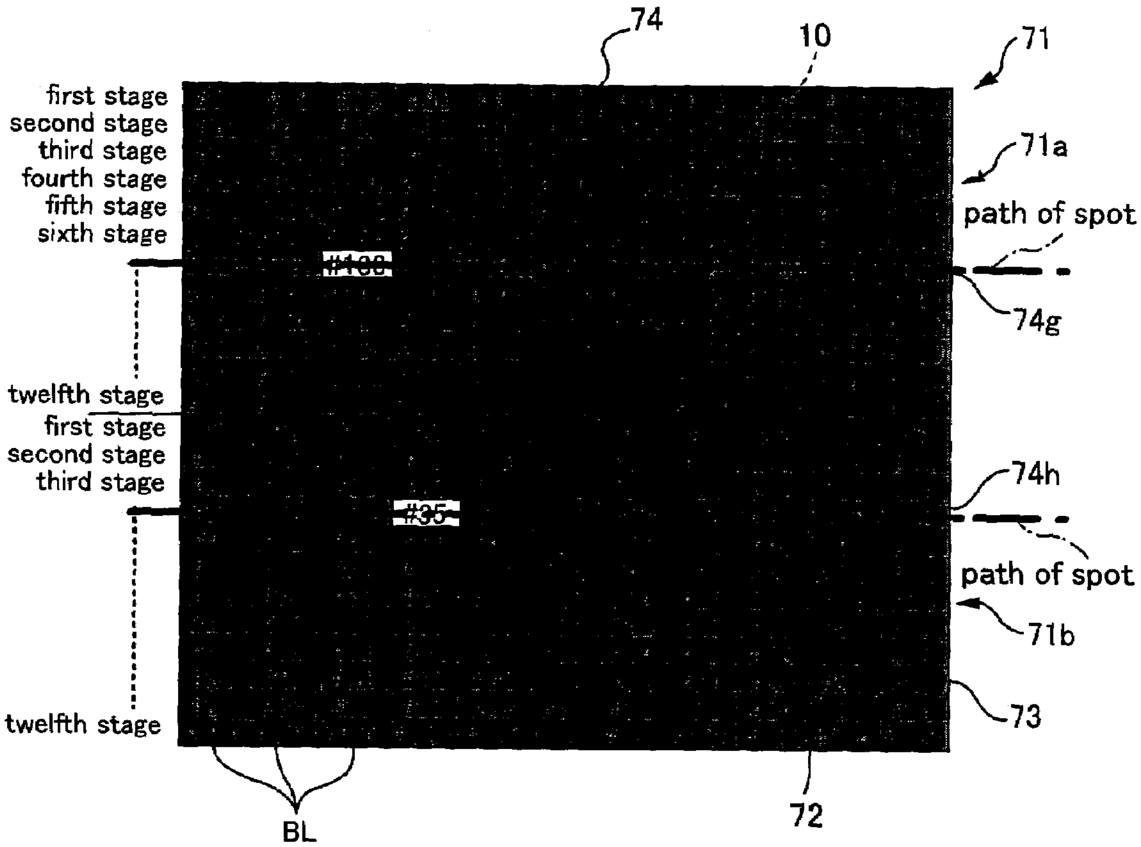
FIG. 14 is an explanatory diagram showing the path of the light when the optical sensor 41 is scanned to obtain base data for setting the threshold value.
Figure 15:
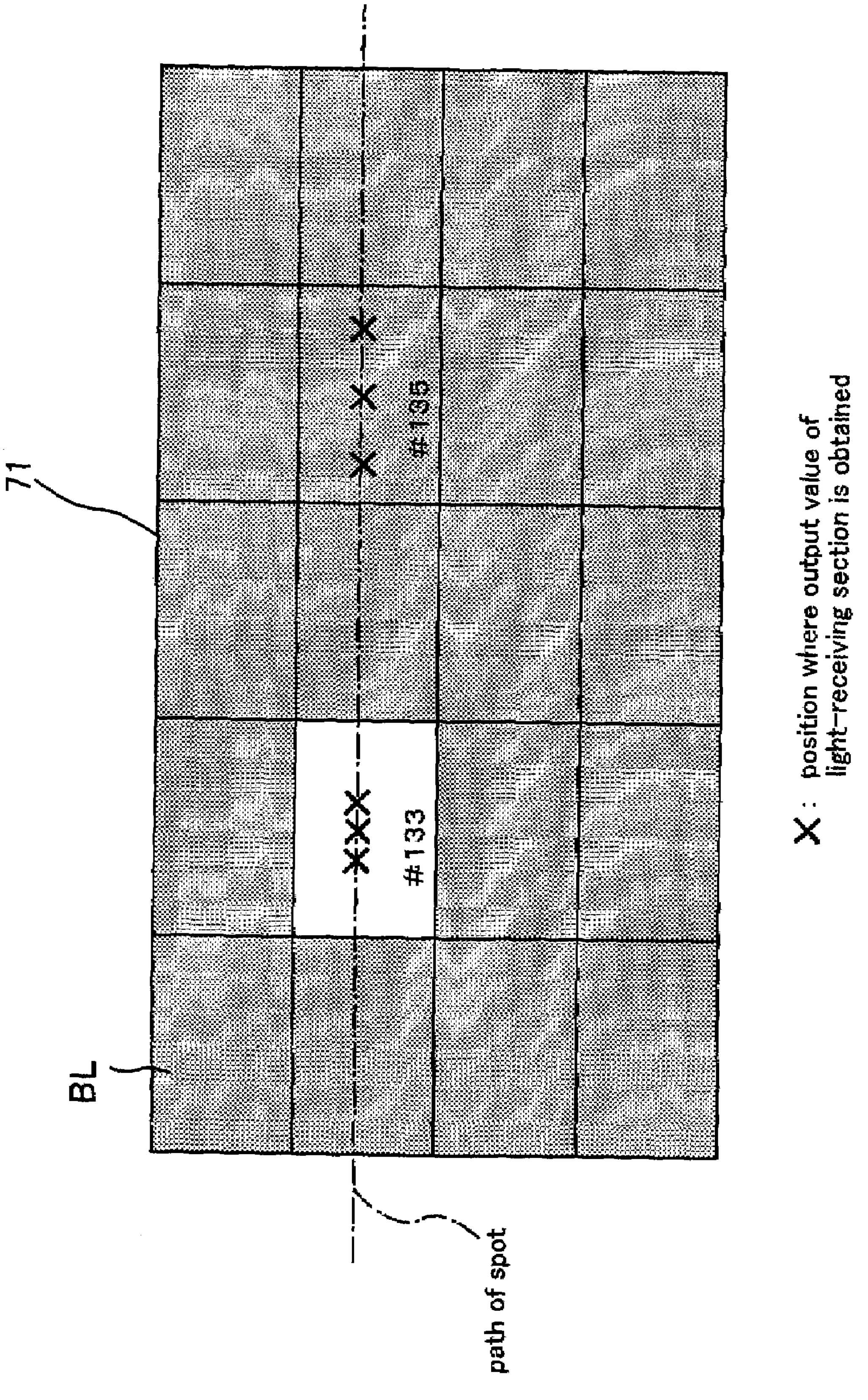
FIG. 15 is a partial magnification of FIG. 14.

FIG. 13 is a flowchart showing the procedure for setting the threshold value, FIG. 14 is an explanatory diagram showing the path of the light when the optical sensor 41 is scanned in order to obtain the base data for setting the threshold value, and FIG. 15 is a partial magnification of FIG. 14.

First, ink is ejected from all the nozzles of the dark black nozzle row KD to print the above-mentioned print pattern (S101). The print pattern that is printed is viewed to check that all print blocks have been formed and that ink has been ejected from all nozzles (S102). At this time, if print blocks are found to be missing from the print pattern, then cleaning is performed with the cleaning mechanism 200 (S103), and then whether or not ink is ejected from all of the nozzles is checked.

Next, gain adjustment of the optical sensor 41 is performed (S104). Gain adjustment is for preventing output variation due to individual differences between optical sensors and for preventing the output from dropping due to the material or color of the print medium, for example. A print paper that is the same as the print paper on which the print pattern is formed is supplied to the printer 20 so that the conditions are the same as those during determination, and white paper portions, that is, areas where nothing has been printed, of the print paper are brought into opposition with the optical sensor 41. In this state, light is emitted from the light-emitting section 41*a* toward the print paper, and the output of the light-receiving section 41*b* that receives that reflection light is detected. At this time, the amount of light emitted from the light-emitting section 41*a* is adjusted by the light amount control means, or the output of the light-receiving section 41*b* is adjusted by the output control means, which are controlled by the system controller 54, such that the output from the light-receiving section 41*b* becomes a predetermined value. Here, by setting the predetermine value to, for example, a value that is near the upper or lower limit in which the output from the light-receiving section 41*b* changes linearly due to differences in the print paper and the ink color, the output range from the light-receiving section 41*b* becomes broad, allowing the determination accuracy of the optical sensor 41 to be improved.

Next, the print pattern is printed again, but control is performed such that two print blocks are intentionally not printed in the print pattern that is printed this time, as shown in FIG. 14 (S105). Here, ink is not ejected from the 35th nozzle #35 and the 133rd nozzle #133. To print a print pattern in this manner such that only predetermined print blocks are intentionally not printed, it is necessary to confirm that ink is ejected from all nozzles in advance as discussed above.

Print block arrays 74*g* and 74*h*, of the print pattern with two print blocks missing, to which the two print blocks that should have been formed by the 35th nozzle #35 and the 133rd nozzle #133 belong are both scanned by the optical sensor 41 (S106, S109). At this time, as shown in FIG. 15, the optical sensor 41 obtains the output from the light-receiving section 41*b* three times when passing near the center of the area where the print block has not been formed and three times at positions that are sufficiently away from the area that has not been printed (S107, S110). The outputs obtained from the light-receiving section 41*b* at this time are subjected to analog-digital conversion (A/D conversion) and converted into binary data.

Then, an average value Vn1 of the three "output values upon non-ejection" obtained at the area corresponding to the print block that should have been formed by the 133rd nozzle #133, and an average value Vb1 of the three "output values upon ejection" obtained at the area where print blocks have been formed that are obtained in this scan, are both stored in the memory (S108). Also, an average valve Vn2 of the three "output values upon non-ejection" obtained at the area corresponding to the print block that should have been formed by the 35th nozzle #35, and an average value Vb2 of the three "output values upon ejection" obtained at the area where print blocks have been formed that are obtained in this scan, are both stored in the memory (S111).

Further, the average values Vn and Vb of the two average values Vn1 and Vn2 of the output values upon non-ejection and the two average values Vb1 and Vb2 of the output values upon ejection that are obtained in the above two scans are respectively calculated and stored in the memory (S112).

Then, a value between the average value Vn of the output values upon non-ejection and the average value Vb of the output values upon ejection is set as the threshold value (S112). That is, the threshold value Vs is expressed by the following formula, for example.

Threshold value $Vs=Vb+(Vn-Vb)\times 0.7$

The threshold value Vs found in this manner is stored in the memory in advance, and when determining whether or not ink has been ejected, the output value that is output from the light-receiving section 41*b* when scanning the print pattern is compared against this threshold value Vs. In other words, if the output value of the light-receiving section 41*b* is smaller than the threshold value Vs, then it is determined that ink has been ejected, and if the output value is larger than the threshold value Vs, then it is determined that ink has not been ejected.

Figure 16:
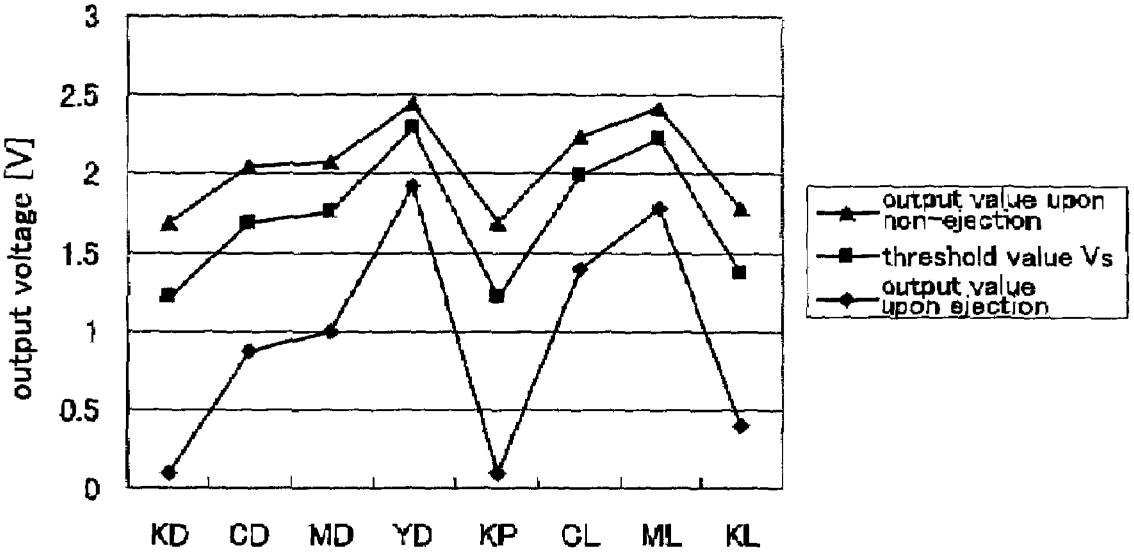
FIG. 16 is a diagram showing the output data of the light-receiving section when threshold values have been set for each ink color.

FIG. 16 is a diagram showing the output data of the light-receiving section in a case where a threshold value is set for each ink color. As shown in this diagram, the output values upon non-ejection that are output from the light-receiving section 41*b* when only the print block to be determined, which is the object of determination, has not been printed and the output values upon ejection that are output from the light-receiving section 41*b* when print blocks have been printed in the entire region of the spot are different depending on the different ink colors, and thus threshold values are set, in correspondence with the respective ink colors, between these output values upon non-ejection and output values upon ejection.

These threshold values are stored corresponding to each of the combinations of the material and color of the print medium, and the ink colors, for example, and are suitably read from the memory each time determination is performed due to a command made by a user or the like through a host computer connected to the printer or input means of the printer, for example.

Also, as discussed above, the print patterns for the plurality of ink colors are lined up in the main-scanning direction, and thus the output values of the light-receiving section 41*b* that are obtained for setting the threshold values for each color can be obtained for all ink colors in two scans.

That is, the system controller 54 (FIG. 3) calculates the sensor position information based on the head position information of the linear encoder 29 (FIG. 1) and compares this with the position information of the print blocks stored in advance in the main memory 56, and thus it is possible to obtain the output values from the light-receiving section for an area where a print block has been printed and for an area where a print block has not been printed in the print pattern for each color and set the threshold values. Thus, appropriate threshold values can be set easily, and it is also possible to reduce the needless use of print paper.

In the present embodiment, an example was described in which scanning for obtaining output values upon ejection and output values upon non-ejection was performed twice at different positions in the sub-scanning direction, and in each scan output values were obtained three times respectively, but there is no limitation to this regarding the number of times of scans or the number of times the output values are obtained.

Other Embodiments

In the foregoing embodiment, it is also possible to substitute some of the configuration that is achieved by hardware for software, and conversely, it is also possible to substitute some of the configuration that is achieved by software for hardware For example, it is possible for some of the functions of the system controller 54 (FIG. 3) to be executed by the host computer 100.

It should be noted that the present invention can be achieved in various other implementations other than a printing apparatus, and for example, it is also possible to work the present invention in implementations such as an ink ejection determining method, a nozzle determining method and device, a computer program for achieving on a computer the functions of these methods or devices, and a computer-readable storage medium on which this program is stored.

A computer program for achieving these functions is provided in a format where it is stored on a computer-readable storage medium such as a floppy (registered trademark) disk or CD-ROM. The host computer 100 reads the computer program from this storage medium and transfers it to an internal storage device or an external storage device. Alternately, it is also possible to supply the computer program to the host computer 100 from a program supply device over a communications route. When working the functions of the computer program, the computer program stored on the internal storage device is executed by a microprocessor of the host computer 100. It is also possible for the computer program stored on a storage medium to be executed directly by the host computer 100.

In this specification, the host computer 100 conceptually includes both a hardware device and an operation system, and is used to mean a hardware device that is operated under the control of an operation system. The computer program achieves the functions of the various sections mentioned above on such a host computer 100. It should be noted that it is also possible to achieve some of the functions described above through the operation system rather than an application program.

It should be noted that in this invention a "computer-readable storage medium" is not limited to portable recording media such as flexible disks or CD-ROMs, and also includes internal storage devices within a computer, such as various types of RAMs and ROMs, and external storage devices that are fixed to a computer, such as hard disks.

What is claimed is:

1. A determining method for determining whether or not ink was ejected from nozzles in a printing apparatus including a plurality of nozzles for ejecting ink and a sensor for emitting light toward a print medium on which a print pattern has been printed by ejecting ink from said plurality of nozzles and receiving the light that is reflected, said method comprising:

a step of printing a non-ejection print pattern that is made of print blocks that can be formed for each said nozzle and in which only a print block to be determined, which is an object of determination, included within a region of said print medium that is irradiated by said light is not printed;

a step of emitting light from said sensor toward said print medium on which said non-ejection print pattern has been printed and obtaining an output value upon non-ejection that is output from said sensor;

a step of printing an all-ejection print pattern in which the print blocks have been printed in the entire area within said region of said print medium that is irradiated by said light;

a step of emitting light from said sensor toward said print medium on which said all-ejection print pattern has been printed and obtaining an output value upon ejection that is output from said sensor;

a step of setting a threshold value between said output value upon non-ejection and said output value upon ejection; and a step of comparing said threshold value with an output value that is output from said sensor based on light that is emitted toward a print medium on which said print pattern has been printed by ejecting ink from said plurality of nozzles.

2. A determining method according to claim 1, wherein said print pattern is printed such that, when ink is ejected from all of said nozzles, a plurality of said print blocks are adjacent to one another and the periphery of said print block to be determined is surrounded by other print blocks.

3. A determining method according to claim 1, wherein a plurality of the output values upon non-ejection for when only a specific print block has not been printed and a plurality of the output values upon ejection for when all of said print blocks have been printed in a specific region that is irradiated by said light are obtained, and said threshold value is set based on an average value of said output values upon non-ejection and an average value of said output values upon ejection.

4. A determining method according to claim 3, wherein said specific print block and said specific region that is irradiated by said light are varied and a plurality of said output values upon non-ejection and a plurality of said output values upon ejection are obtained, and said threshold value is set based on a value obtained by averaging an average value of said output values upon non-ejection and a value obtained by averaging an average value of said output values upon ejection.

5. A determining method according to claim 1, wherein said nozzles are capable of ejecting a plurality of colors of ink, and said threshold value is set respectively based on each of said colors of ink.

6. A determining method according to claim 1, wherein a light amount of said sensor is adjusted such that an output value of said sensor that has received the light reflected by a non-printed section of said print medium becomes a predetermined value.

7. A computer-readable medium for causing a printing apparatus, which includes a plurality of nozzles for ejecting ink and a sensor for emitting light toward a print medium on which a print pattern has been printed by ejecting ink from said plurality of nozzles and receiving the light that is reflected, to operate, said computer-readable medium comprising the following codes for determining whether or not ink has been ejected from said nozzles:

a code for printing a non-ejection print pattern that is made of print blocks that can be formed for each said nozzle and in which only a print block to be determined, which is an object of determination, included within a region of said print medium that is irradiated by said light is not printed;

a code for emitting light from said sensor toward said print medium on which said non-ejection print pattern has been printed and obtaining an output value upon non-ejection that is output from said sensor;

a code for printing an all-ejection print pattern in which the print blocks have been printed in the entire area within said region of said print medium that is irradiated by said light;

a code for emitting light from said sensor toward said print medium on which said all-ejection print pattern has been printed and obtaining an output value upon ejection that is output from said sensor;

a code for setting a threshold value between said output value upon non-ejection and said output value upon ejection; and a code for comparing said threshold value with an output value that is output from said sensor based on light that is emitted toward a print medium on which said print pattern has been printed by ejecting ink from said plurality of nozzles.

8. A printing apparatus comprising:

a plurality of nozzles for ejecting ink;

a sensor for emitting light toward a print medium on which a print pattern made of print blocks that can be formed for each of said nozzles has been printed by ejecting ink from said plurality of nozzles and receiving the light that is reflected; and a determination section for determining whether or not ink has been ejected from said nozzles by comparing a predetermined threshold value with an output value that is output from said sensor based on light that is received by said sensor;

wherein said threshold value is set between an output value upon non-ejection and an output value upon ejection, said output value upon non-ejection being output from said sensor when only a print block to be determined, which is an object of said determination, included within a region of said print medium that is irradiated by said light is not printed, and said output value upon ejection being output from said sensor when the print blocks have been printed in the entire area of said region.

* * * * *